(12) United States Patent
Li et al.

(10) Patent No.: US 8,255,424 B2
(45) Date of Patent: Aug. 28, 2012

(54) SYSTEM AND METHOD FOR STRUCTURING DATA IN A STORAGE DEVICE

(75) Inventors: Shen-Chun Li, Taipei Hsien (TW); Yung-Chieh Chen, Taipei Hsien (TW); Shou-Kuo Hsu, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 367 days.

(21) Appl. No.: 12/558,683

(22) Filed: Sep. 14, 2009

(65) Prior Publication Data

US 2010/0257208 A1 Oct. 7, 2010

(30) Foreign Application Priority Data

Apr. 3, 2009 (CN) .......................... 2009 1 0301346

(51) Int. Cl.
*G06F 7/00* (2006.01)
*G06F 17/30* (2006.01)

(52) U.S. Cl. ........... 707/801; 707/E17.01; 707/E17.044; 707/E17.051; 713/193; 380/281; 711/E12.045; 711/E12.048

(58) Field of Classification Search .................. 707/801, 707/E17.01, E17.044, E17.051; 713/189, 713/193; 380/281; 711/E12.045, E12.048
See application file for complete search history.

(56) References Cited

U.S. PATENT DOCUMENTS

| 3,568,156 A * | 3/1971 | Thompson ............ 707/E17.041 |
| 4,398,248 A * | 8/1983 | Hsia et al. ................. 365/230.03 |
| 5,018,207 A * | 5/1991 | Purdum ........................ 382/112 |
| 5,237,678 A * | 8/1993 | Kuechler et al. ....... 707/999.005 |
| 5,550,459 A * | 8/1996 | Laplace ........................ 323/255 |
| 6,314,437 B1 * | 11/2001 | Starek et al. ........... 707/999.202 |
| 6,924,780 B1 * | 8/2005 | Horst et al. ..................... 345/82 |
| 7,567,716 B2 * | 7/2009 | Henry et al. .................. 382/232 |
| 7,752,459 B2 * | 7/2010 | Cowan et al. ................. 713/190 |
| 2001/0011267 A1 * | 8/2001 | Kihara et al. ..................... 707/1 |
| 2002/0123995 A1 * | 9/2002 | Shibuya ........................... 707/6 |
| 2002/0196402 A1 * | 12/2002 | Sanford et al. ................. 349/158 |
| 2007/0106662 A1 * | 5/2007 | Kimbrough et al. .............. 707/5 |
| 2007/0294502 A1 * | 12/2007 | Gunther ........................ 711/173 |
| 2008/0060077 A1 * | 3/2008 | Cowan et al. ................... 726/25 |
| 2009/0190156 A1 * | 7/2009 | Iwadate ....................... 358/1.14 |
| 2010/0257208 A1 * | 10/2010 | Li et al. ......................... 707/801 |

OTHER PUBLICATIONS

Daniel Kroening, Alex Groce, and Edmund Clarke— "Counterexample Guided Abstraction Refinement Via Program Execution"—Formal Methods and Software Engineering Lecture Notes in Computer Science, 2004, vol. 3308/2004, (pp. 224-238).*
Nikos Karayannidis and Timos Sellis—"SISYPHUS: A Chunk-Based Storage Manager for OLAP Cubes"—Proceedings of the International Workshop on Design and Management of Data Warehouses (DMDW'2001) Interlaken, Switzerland, Jun. 4, 2001 (pp. 10-1-10-11: 1-11).*

* cited by examiner

*Primary Examiner* — John E Breene
*Assistant Examiner* — Anh Ly
(74) *Attorney, Agent, or Firm* — Altis Law Group, Inc.

(57) ABSTRACT

A system, storage medium, and method for structuring data are provided. The system connects to a storage device that stores original data. The method obtains the original data from the storage device, and stores the original data in the form of character strings into a buffer memory according to end of file-line (EOF) tags. The method further constructs data arrays to store the character strings, and arranges each of the data arrays into a data matrix. In addition, the method classifies each of the data arrays in the data matrix according to properties of the character strings, arranges the classified data arrays into a data file, and stores the data file into the buffer memory.

12 Claims, 4 Drawing Sheets

SYSTEM AND METHOD FOR STRUCTURING DATA IN A STORAGE DEVICE

BACKGROUND

1. Technical Field

Embodiments of the present disclosure relate generally to systems and methods for processing data, and more particularly to a system and method for structuring data in a storage device.

2. Description of Related Art

As known in the art, data storage systems typically store massive amounts of printed circuit design-related data, which can include component placement and signal path routing information for circuit designing electronic devices, such as printed circuit boards (PCBs). However, such design-related data may be irregularly stored in a storage system. A computer-aided design (CAD) tool can be used to assist in designing the layout and signal routing for a PCB. This problem may result in difficulty and slowly searching and reading such irregular design-related data from the storage system during the process of designing the PCB.

Accordingly, there is a need for an improved system and method for structuring data in a storage system, so as to overcome the above-mentioned problems.

DETAILED DESCRIPTION

The invention is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
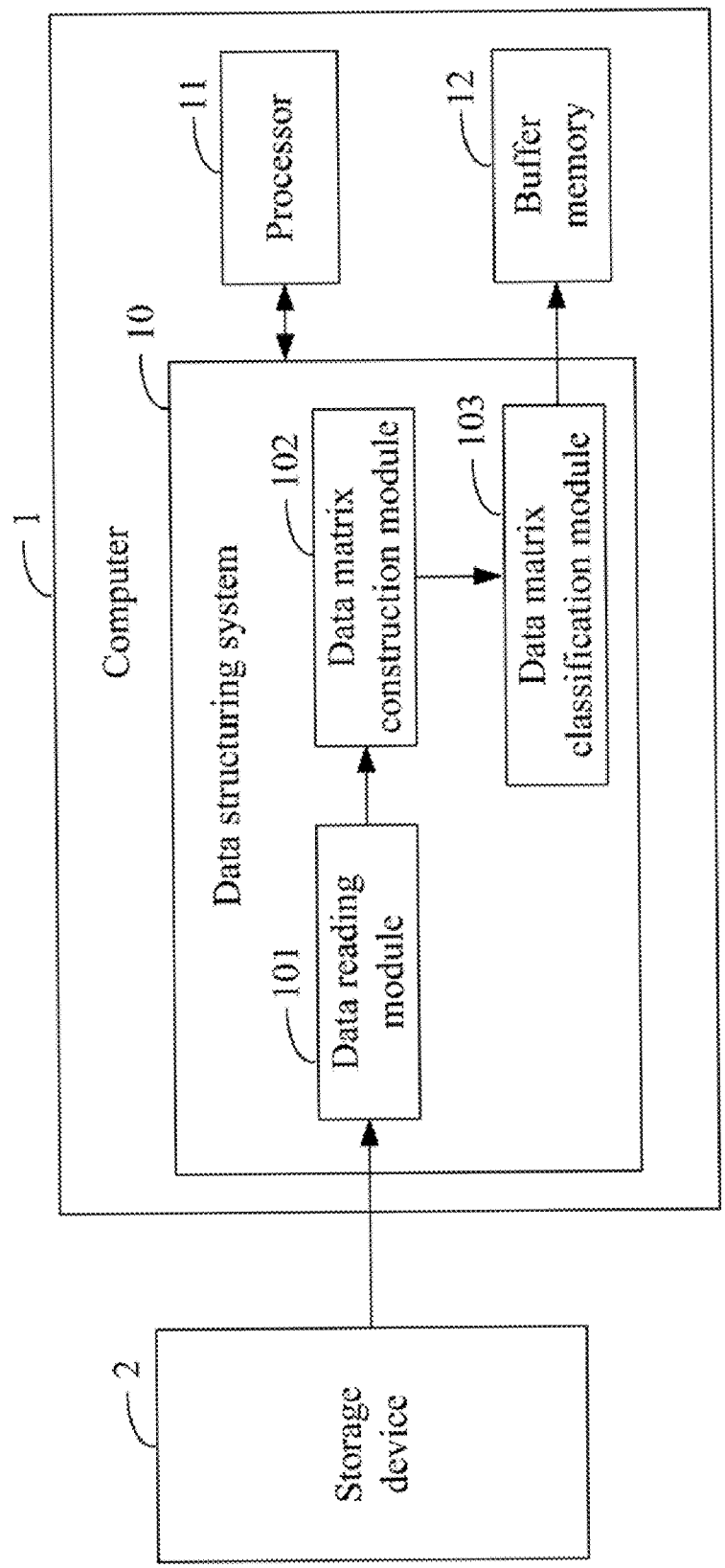
FIG. 1 is a schematic diagram of one embodiment of a system for structuring data in a storage device.

FIG. 1 is a schematic diagram of one embodiment of a data structuring system 10. In one embodiment, the data structuring system 10 is utilized in a computer 1, and executed by at least one processor 11 thereof. The computer 1 connects to a storage device 2 storing original data that needs to be structured by the data structuring system 10. In the embodiment, the storage device 2 may be a hard disk drive, an optical drive, a networked drive, or some combination of various digital storage devices. The computer 1 further includes a buffer memory 12 storing the original data during processing thereof. In the embodiment, the buffer memory 12 may be an internal storage device, such as a random access memory (RAM) for temporary storage of information and/or a read only memory (ROM) for permanent storage of information.

The data structuring system 10 is used to obtain original data from the storage device 2, process and structure the original data to generate structured data, and store the structured data into the buffer memory 12. In one embodiment, the data structuring system 10 is stored in a storage medium or any computer readable medium of the computer 1, and is executed by the at least one processor 11. In another embodiment, the data structuring system 10 may be included in an operating system of the computer 1, such as Unix, Linux, Windows 95, 98, NT, 2000, XP, Vista, Mac OS X, an embedded operating system, or any other compatible operating system.

In one embodiment, the data structuring system 10 may include a data obtaining module 101, a data matrix construction module 102, and a data matrix classification module 103. Each of the function modules 101-103 may comprise one or more computerized operations executable by the at least one processor 11 of the computer 2. In general, the word "module," as used herein, refers to logic embodied in hardware or firmware, or to a collection of software instructions, written in a programming language, such as, for example, Java, C, or assembly. One or more software instructions in the modules may be embedded in firmware, such as an EPROM. The modules described herein may be implemented as either software and/or hardware modules and may be stored in any type of computer-readable medium or other storage device.

The data reading module 101 is operable to obtain original data from the storage device 2, and store the original data in the form of character strings into a buffer memory according to end of file-line (EOF) tags. In one embodiment, the original data may be information of electronic components of a printed circuit board (PCB), such as a product ID and a product date of each of the electronic components, and board structural information and layout information of the PCB, for example. The original data can be stored in the form of *.DSN document in the storage device 2. The EOF tag may be a first tag, a second tag, . . . , and an end tag. For example, if a character string is stored in the first line, the character string is marked with the first tag. If a character string is stored in the second line, the character string is marked with the second tag. If a character is stored in the last line, the character string is marked with the end tag.

The data reading module 101 is further operable to generate a data reading pointer to point to each of the character strings, and determine whether the reading pointer points to a character string with the end tag. In one embodiment, the data reading pointer points to a character string when a character string is read from the buffer memory, and then points to another character string next to the read character string after the read character string is deleted from the buffer memory 12.

The data matrix construction module 102 is operable to construct a data array to store the character strings based on a capacity of each data array, and arrange each data array into a data matrix. Depending on the embodiment with respect FIG. 2, the data matrix 20 may include "data array1," "data array2," "data array3," "data array4," "data array5," "data array6," "data array7," "data array8," and "data array9". Each of the data arrays stores the character strings read from the buffer memory. The data matrix construction module 102 is further operable to generate a temporary variable that stores the character strings read from the buffer memory. In one embodiment, the data matrix construction module 102 defines the capacity of the temporary variable as 2 MB, for example. The data matrix construction module 102 is further operable to define a capacity of the temporary variable, and determine whether a total size of the stored character strings of the temporary variable is less than or equal to the capacity of the temporary variable.

The data matrix classification module 103 is operable to classify each of the data arrays in the data matrix according to properties of the character strings, and arrange the classified data arrays into a data file. Details of classifying each of the data arrays in the data matrix are described as FIG. 2 below.

The data matrix classification module 103 is further operable to encrypt the data folder to an encrypted data file, and store the encrypted data file into the buffer memory 12.

Figure 2:
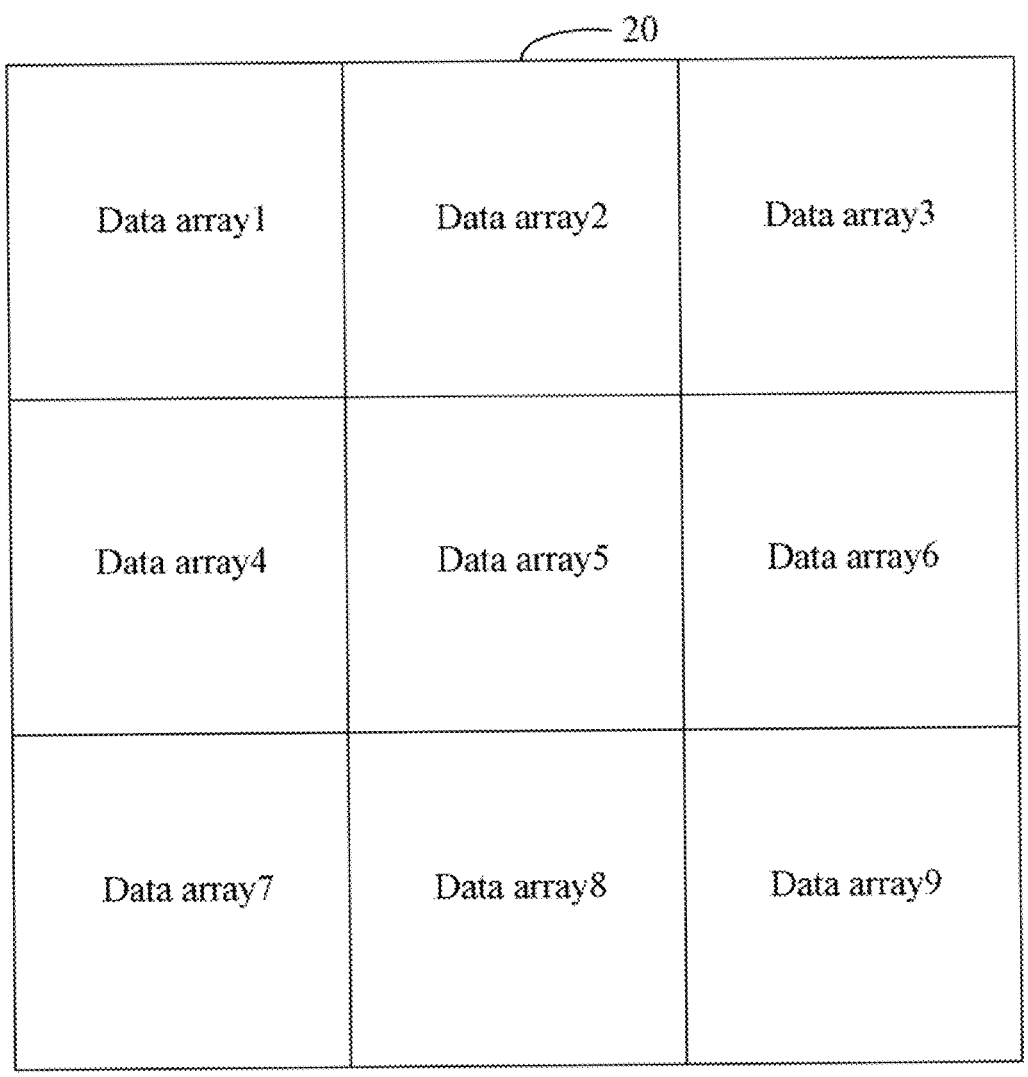
FIG. 2 is a schematic diagram illustrating a data matrix including a plurality of data arrays.

FIG. 2 is a schematic diagram illustrating a data matrix including a plurality of data arrays. In one embodiment, the data matrix 20 includes nine data arrays, e.g., data array1-data array9. Each of the data arrays stores information of electronic components of a printed circuit board (PCB) according to the same properties of the electronic components. The data array1 stores a first category of information of the electronic components, such as a product ID and a product date of each of the electronic components. The data array2 stores a second category of information, such as board information and structural information of the PCB. The data array3 stores a third category of information, such as coordinates of each electronic components located in the PCB. The data array4 stores a fourth category of information, such as definition information of pins located in the PCB, and coordinates of each of the pins. The data array5 stores a fifth category of information, such as a width of via traces located in the PCB, and a length of each of the via traces. The data array 6 stores a sixth category of information, such as net-list information, and connection information between a net-list and a pin. The data array7 stores a seventh category of information, such as layout information of each the electronic components. The data array8 stores an eighth category of information, such as location information of each of the electronic components. The data array9 stores a ninth category of information, such as RGB (i.e., red, green, and blue) information of each of the electronic components. Depending on the embodiment with respect FIG. 2, the data matrix classification module classifies the information of each of the data arrays in the data matrix according to different categories of information.

Figure 3:
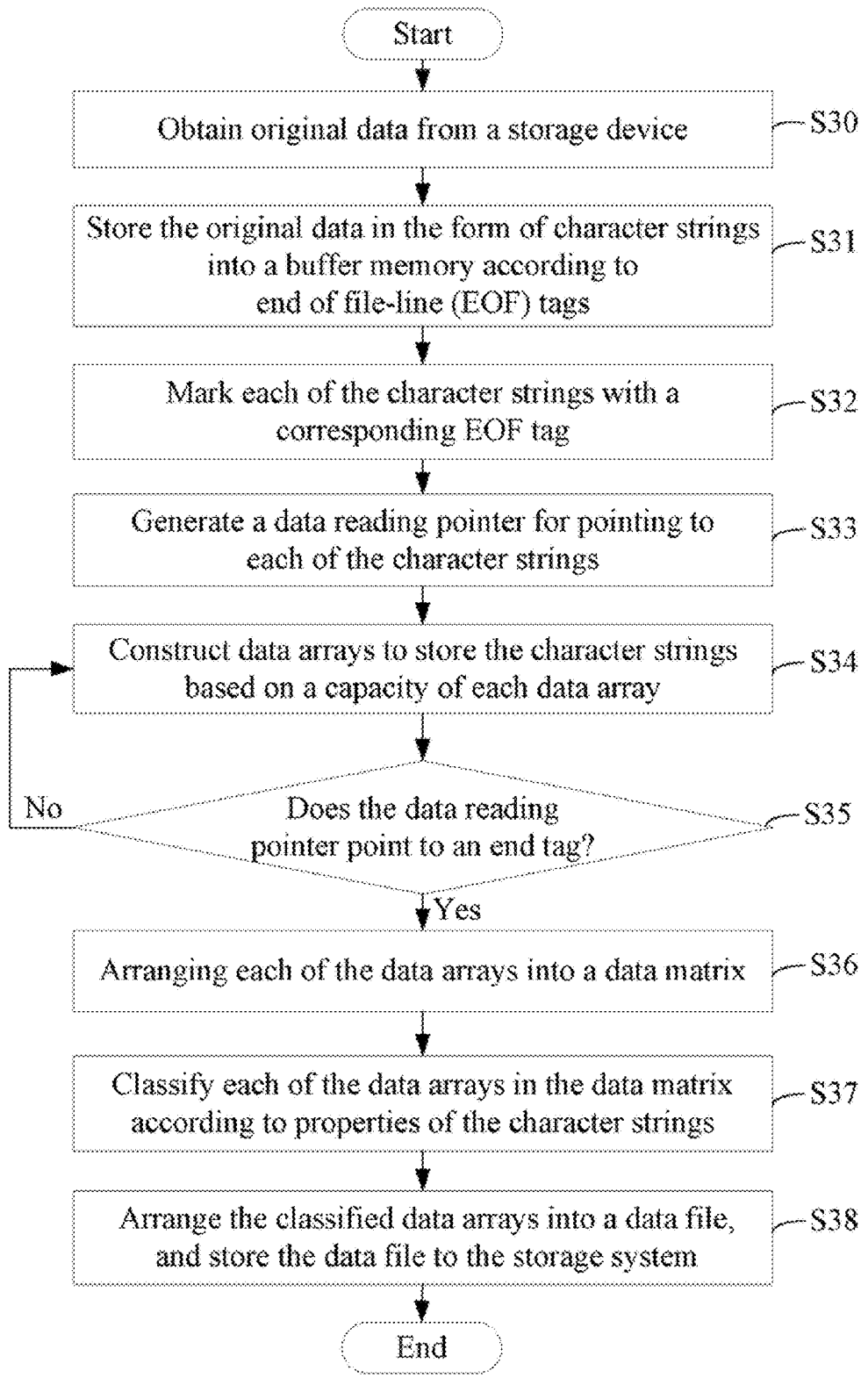
FIG. 3 is a flowchart of one embodiment of a method for structuring data utilized by a data structuring system such as, for example, that of FIG. 1.

FIG. 3 is a flowchart of one embodiment of a method for structuring data utilized by a data structuring system such as, for example, that of FIG. 1. Depending on the embodiment, additional blocks may be added, others removed, and the ordering of blocks may be changed.

In block S30, the data reading module 101 obtains original data from the storage device 2. As mentioned above, the original data may be information of electronic components of a printed circuit board (PCB), such as a product ID and a product date of each of the electronic components, and board structural information and layout information of the PCB, for example. In one embodiment, the original data may be stored in the form of *.DSN document in the storage device 2.

In block S31, the data reading module 101 stores the original data in the form of character strings into the buffer memory 12 according to end of file-line (EOF) tags. In block S32, the data reading module 101 marks each of the character strings with a corresponding EOF tag. In the embodiment, the EOF tag may be a first tag, a second tag, . . . , or an end tag. For example, if a character string is stored in the first line, the character string is marked with the first tag. If a character string is stored in the second line, the character string is marked with the second tag. If a character is stored in the last line, the character string is marked with the end tag.

In block S33, the data reading module 101 generates a data reading pointer for pointing to each of the character strings. In the embodiment, the data reading pointer points to a character string when the character string is read from the buffer memory, and then points to another character string next to the read character string.

In block S34, the data matrix construction module 102 constructs a data array to store the character strings based on a capacity of each data array. The capacity of each data array is predefined when constructing the data array. In one embodiment, the capacity of a data array can be predefined as 2 MB, for example. Details of constructing a data array are described as shown in FIG. 4 to follow.

In block S35, the data reading module 101 determines whether the reading pointer points to a character string with the end tag. If reading pointer does not point to the end tag, block S34 is repeated. Otherwise, if the reading pointer points to the end tag, in block S36, the data matrix construction module 102 arranges each of the data arrays into a data matrix. Depending on the embodiment with respect to FIG. 2, the data matrix 20 may include "data array1," "data array2," "data array3," "data array4," "data array5," "data array6," "data array7," "data array8," and "data array9". Each of the data arrays stores the character strings read from the buffer memory 12.

In block S37, the data matrix classification module 103 classifies the character strings of each of the data arrays in the data matrix according to properties of the character strings. Details of the classification are described in FIG. 2 above. In block S38, the data matrix classification module 103 arranges the classified data arrays into a data file, and stores the data file into the buffer memory 12.

Figure 4:
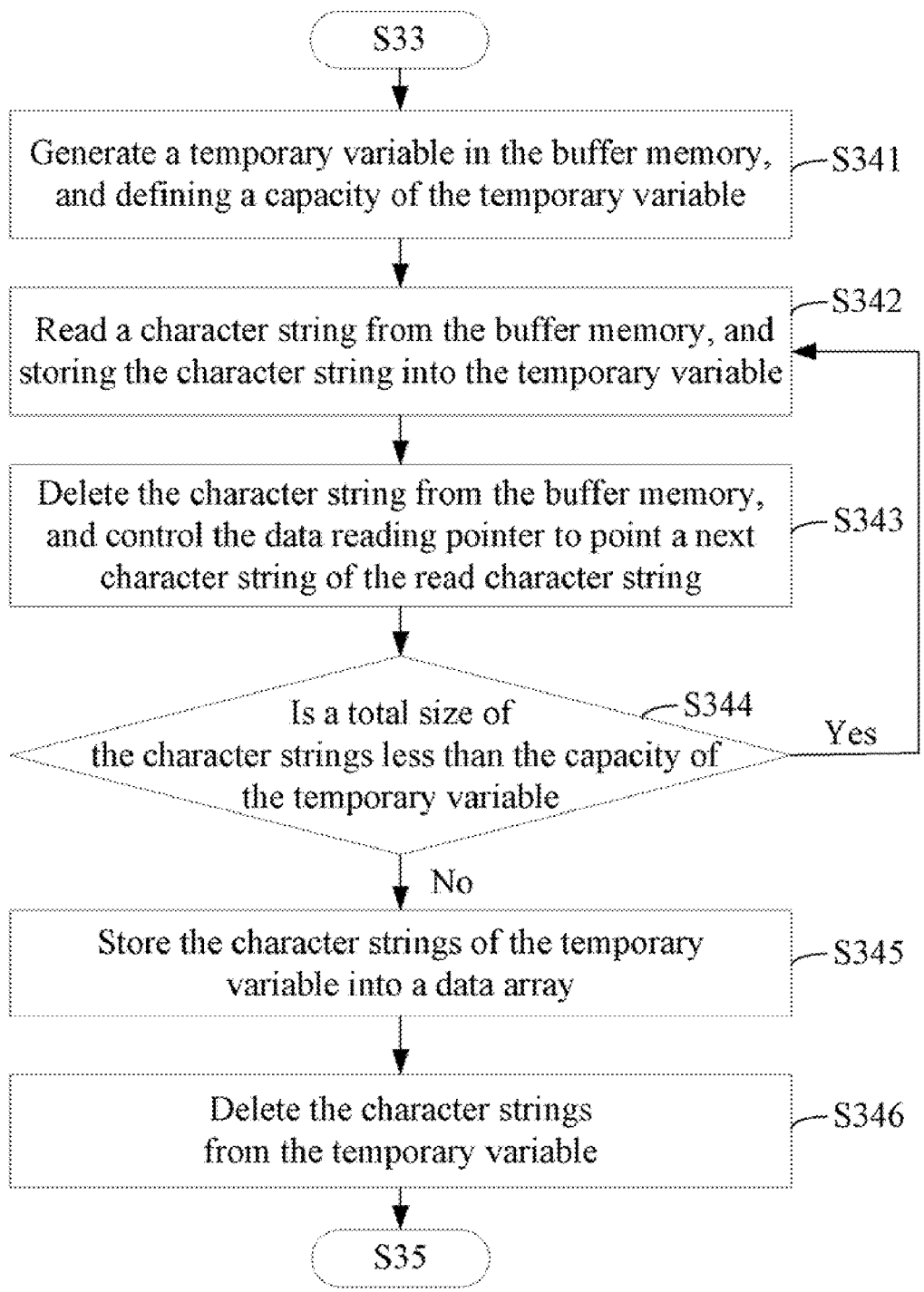
FIG. 4 is a flowchart of detailed descriptions of S34 in FIG. 3.

FIG. 4 is a flowchart of detailed descriptions of S34 in FIG. 3. Depending on the embodiment, additional blocks may be added, others removed, and the ordering of blocks may be changed.

In block S2341, the data matrix construction module 102 generates a temporary variable in the buffer memory 12, and defines a capacity of the temporary variable. As mentioned above, the data matrix construction module 102 can define the capacity of the temporary variable as 2 MB.

In block S342, the data matrix construction module 102 reads a character string from the buffer memory 12, and stores the character string into the temporary variable. In block S343, the data matrix construction module 102 deletes the read character string from the buffer memory 12, and directs the data reading pointer to point to the subsequent character string of the read character string.

In block S344, the data matrix construction module 102 determines whether a total size of the character strings stored in the temporary variable is less than or equal to the capacity of the temporary variable. If the total size (e.g., 1 MB) of the character strings is less than the capacity (i.e., 2 MB) of the temporary variable, block S342 is repeated. Otherwise, If the total size (e.g., 2 MB) of the character strings is equal to the capacity (i.e., 2 MB) of temporary variable, in block S345, the data matrix construction module 102 stores the character strings of the temporary variable into a data array. In block S346, the data matrix construction module 102 deletes the character strings from the temporary variable, so as to release the storage space of the buffer memory 12.

All of the processes described above may be embodied in, and fully automated via, functional code modules executed by one or more general purpose processors of computer devices. The functional code modules may be stored in any type of readable medium or other storage devices. Some or all of the methods may alternatively be embodied in specialized the computer devices.

Although certain inventive embodiments of the present disclosure have been specifically described, the present disclosure is not to be construed as being limited thereto. Various changes or modifications may be made to the present disclosure without departing from the scope and spirit of the present disclosure.

What is claimed is:

1. A system for structuring data in a storage device, the system implemented by a computer connected with the storage device that stores a plurality of original data, the system comprising:
   a data reading module operable to obtain the original data from the storage device, and store the original data in the form of character strings into a buffer memory of the computer according to end of file-line (EOF) tags;
   a data matrix construction module operable to construct a plurality of data arrays, store the character strings to each of the data arrays based on a capacity of the data array, and arrange each of the data arrays into a data matrix;
   a data matrix classification module operable to classify each of the data arrays in the data matrix according to properties of the character strings, and arrange the classified data arrays into a data file, and store the data file into the storage device; and
   wherein the data reading module is further operable to generate a data reading pointer for pointing to each of the character strings, and determine whether the reading pointer points to a character string with an end tag and wherein the data reading pointer points to a character string when the character string is read from the buffer memory, and points to a subsequent character string of the read character string after the read character string is deleted from the buffer memory.

2. The system according to claim 1, wherein the data matrix construction module is further operable generate a temporary variable that stores the character strings read from the buffer memory, define a capacity of the temporary variable, and determine whether a total size of the stored character strings of the temporary variable is less than or equal to the capacity of the temporary variable.

3. The system according to claim 1, wherein the data matrix classification module is further operable to encrypt the data file to an encrypted data file, and store the encrypted data file into the storage device.

4. The system according to claim 1, wherein each of the data arrays stores character strings having the same properties.

5. A computerized method for structuring data in a storage device, the method comprising:
   (a) obtaining original data from the storage device;
   (b) storing the original data in the form of character strings into a buffer memory according to end of file-line (EOF) tags;
   (c) generating a data reading pointer for pointing to each of the character strings, determining whether the reading pointer points to a character string with an end tag;
   (d) reading each of the character strings from the buffer memory when the data reading pointer points to the character string;
   (e) constructing a plurality of data arrays, and storing the character strings to each of the data arrays based on a capacity of the data array;
   (f) arranging each of the data arrays into a data matrix;
   (g) classifying each of the data arrays in the data matrix according to properties of the character strings;
   (h) arranging the classified data arrays into a data file, and storing the data file into the buffer memory; and
   wherein the data reading pointer points to a character string when the character string is read from the buffer memory, and points to a subsequent character string of the read character string after the read character string is deleted from the buffer memory.

6. The method according to claim 5, further comprising:
   repeating block (d) if the reading pointer does not point to the end tag; or
   implementing block (f) if the reading pointer points to the end tag.

7. The method according to claim 5, wherein block (e) comprises:
   (e1) generating a temporary variable in the buffer memory, and defining a capacity of the temporary variable;
   (e2) reading a character string from the buffer memory, and storing the character string into the temporary variable;
   (e3) deleting the read character string from the buffer memory, and directing the data reading pointer to point to a subsequent character string of the read character string;
   (e4) determining whether a total size of the character strings stored in the temporary variable is less than or equal to the capacity of the temporary variable;
   (e5) repeating block (e2) if the total size of the character strings is less than the capacity of the temporary variable, or storing the character strings of the temporary variable into a data array if the total size of the character strings is equal to the capacity of temporary variable; and
   (e6) deleting the character strings from the temporary variable.

8. The method according to claim 5, wherein each of the data arrays stores character strings having the same properties.

9. A computer readable medium having stored thereon instructions that, when executed by at least one processor of a computer, cause the computer to perform a method for structuring data in a storage device, the method comprising:
   (a) obtaining original data from the storage device;
   (b) storing the original data in the form of character strings into a buffer memory according to end of file-line (EOF) tags;
   (c) generating a data reading pointer for pointing to each of the character strings, determining whether the reading pointer points to a character string with an end tag;
   (d) reading each of the character strings from the buffer memory when the data reading pointer points to the character string;
   (e) constructing a plurality of data arrays, and storing the character strings to each of the data arrays based on a capacity of the data array;
   (f) arranging each of the data arrays into a data matrix;
   (g) classifying each of the data arrays in the data matrix according to properties of the character strings;
   (h) arranging the classified data arrays into a data file, and storing the data file into the buffer memory; and
   wherein the data reading pointer points to a character string when the character string is read from the buffer memory, and points to a subsequent character string of the read character string after the read character string is deleted from the buffer memory.

10. The medium according to claim 9, wherein the method further comprises:
    repeating block (d) if the reading pointer does not point to the end tag; or
    implementing block (f) if the reading pointer points to the end tag.

11. The medium according to claim 9, wherein block (e) comprises:
    (e1) generating a temporary variable in the buffer memory, and defining a capacity of the temporary variable;

(e2) reading a character string from the buffer memory, and storing the character string into the temporary variable;

(e3) deleting the read character string from the buffer memory, and directing the data reading pointer to point to a subsequent character string of the read character string;

(e4) determining whether a total size of the character strings stored in the temporary variable is less than or equal to the capacity of the temporary variable;

(e5) repeating block (e2) if the total size of the character strings is less than the capacity of the temporary variable, or storing the character strings of the temporary variable into a data array if the total size of the character strings is equal to the capacity of temporary variable; and (e6) deleting the character strings from the temporary variable.

12. The medium according to claim 9, wherein each of the data arrays stores character strings having the same properties.

* * * * *